United States Patent
Langereis

(10) Patent No.: US 10,925,012 B2
(45) Date of Patent: *Feb. 16, 2021

(54) CELLULAR USER EQUIPMENT AND METHOD OF OPERATION

(71) Applicant: Telefonaktiebolaget LM Ericsson (publ), Stockholm (SE)

(72) Inventor: Alexander Langereis, Sigtuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/527,658

(22) Filed: Jul. 31, 2019

(65) Prior Publication Data

US 2019/0357163 A1  Nov. 21, 2019

Related U.S. Application Data

(63) Continuation of application No. 15/905,141, filed on Feb. 26, 2018, now Pat. No. 10,420,046, which is a
(Continued)

(51) Int. Cl.
*H04W 56/00* (2009.01)
*H04W 72/04* (2009.01)

(52) U.S. Cl.
CPC ... *H04W 56/0005* (2013.01); *H04W 56/0045* (2013.01); *H04W 72/0413* (2013.01)

(58) Field of Classification Search
CPC ......... H04W 56/0005; H04W 56/0045; H04W 72/0413
(Continued)

(56) References Cited

U.S. PATENT DOCUMENTS 8,462,688 B1  6/2013 Dinan et al.
2009/0316641 A1  12/2009 Yamada et al.
(Continued)

FOREIGN PATENT DOCUMENTS

EP  2701439 A1  2/2014
JP  2009521894 A  6/2009
(Continued)

OTHER PUBLICATIONS

"3GPP TS 36.321 V12.2.1"; 3rd Generation Partnership Project; Technical Specification Group Radio Access Network; Evolved Universal Terrestrial Radio Access (E-UTRA); Medium Access Control (MAC) protocol specification (Release 12); Jun. 2014, pp. 1-57.
(Continued)

*Primary Examiner* — Faisal Choudhury
(74) *Attorney, Agent, or Firm* — Murphy, Bilak & Homiller, PLLC

(57) ABSTRACT

Embodiments include methods of operating a user equipment (UE) in a serving cell provided by a base station in a cellular communications network. These embodiments include establishing a Radio Resource Control (RRC) connection with the base station, such that the UE is operating in an RRC Connected state according to a first value of a parameter (e.g., a time alignment timer value) affecting the UE's uplink synchronization with the serving cell. These embodiments also include initiating a reconfiguration of the RRC connection towards the base station and, in response to initiating the reconfiguration, receiving from the base station a second value of the parameter affecting the UE's uplink synchronization with the serving cell. These embodiments also include operating in an RRC Connected state according to the second value of the parameter. Other embodiments
(Continued)

include UEs configured to perform operations corresponding to these methods.

15 Claims, 4 Drawing Sheets

Related U.S. Application Data continuation of application No. 14/772,286, filed as application No. PCT/EP2014/068614 on Sep. 2, 2014, now Pat. No. 9,949,222.

(58) Field of Classification Search
USPC .......................................................... 370/350
See application file for complete search history.

(56) References Cited

U.S. PATENT DOCUMENTS

| | | | |
|---|---|---|---|
| 2009/0318175 A1 | 12/2009 | Sandberg et al. | |
| 2010/0091725 A1 | 4/2010 | Ishii | |
| 2011/0007681 A1 | 1/2011 | Park et al. | |
| 2012/0244871 A1 | 9/2012 | Zhao et al. | |
| 2013/0114576 A1* | 5/2013 | Kwon | H04W 28/18 |
| | | | 370/336 |
| 2013/0258959 A1* | 10/2013 | Dinan | H04W 56/0005 |
| | | | 370/329 |
| 2014/0023054 A1 | 1/2014 | Yang et al. | |
| 2014/0105190 A1 | 4/2014 | Chun et al. | |
| 2014/0355504 A1 | 12/2014 | Sebire et al. | |
| 2015/0308655 A1* | 10/2015 | Holmes | F21V 29/51 |
| | | | 362/235 |
| 2016/0198507 A1 | 7/2016 | Wu et al. | |
| 2016/0218406 A1* | 7/2016 | Sanford | H01P 1/208 |
| 2016/0227586 A1* | 8/2016 | Chen | H04W 76/19 |
| 2020/0037218 A1* | 1/2020 | Karampatsis | H04W 36/16 |

FOREIGN PATENT DOCUMENTS

| | | |
|---|---|---|
| JP | 2014516229 A | 7/2014 |
| WO | 2013079104 A1 | 6/2013 |

OTHER PUBLICATIONS

"3GPP TS 36.331 V11.2.0", 3rd Generation Partnership Project; Technical Specification Group Radio Access Network; Evolved Universal Terrestrial Radio Access (E-UTRA); Radio Resource Control (RRC); Protocol specification (Release 11), Dec. 2012, pp. 1-340.

"Control of RA before D-SR Configuration", 3GPP TSG-RAN WG2 #81, Tdoc R2-130402, St. Julian's, Malta, Jan. 28-Feb. 1, 2013, pp. 1-4.

"Support of Scell (de)activation", 3GPP TSG-RAN WG2 Meeting #70bis; R2-103955 Stockholm, Sweden; Jun. 28-Jul. 2, 2010, pp. 1-3.

\* cited by examiner

CELLULAR USER EQUIPMENT AND METHOD OF OPERATION

CROSS-REFERENCE TO RELATED APPLICATION

This application is a continuation of, and claims the benefit of priority from, U.S. application Ser. No. 15/905,141 filed Feb. 26, 2018, which is a continuation of, and claims the benefit of priority from, U.S. application Ser. No. 14/772,286 filed Sep. 2, 2015 (issued as U.S. Pat. No. 9,949,222 on Apr. 17, 2018), which is a U.S. national-stage of International Appl. PCT/EP2014/068614 filed Sep. 2, 2014. The entire disclosures of the above-mentioned applications are incorporated herein by reference for all purposes.

TECHNICAL FIELD

This disclosure relates to base stations and user equipment, for use in a cellular communications network, and to methods of operation thereof.

BACKGROUND

In a Long-Term Evolution (LTE) cellular network, as defined in standards set by the 3rd Generation Partnership Project (3GPP), coverage for User Equipment (UE) devices is provided by a Radio Access Network known as the Evolved UMTS Terrestrial Radio Access Network (E-UTRAN). Access points or base stations within the Radio Access Network, that provide service to UE devices over the air interface, are known as Evolved NodeBs (eNodeBs or eNBs). A UE device within a cell may be in a Radio Resource Control (RRC) Idle state or in an RRC Connected state. When the UE device is in the RRC Connected state, it is either uplink (UL) synchronized or not UL synchronized with the cell.

The UE must be synchronized in the uplink in order to be able to transmit signals to the eNodeB over the air interface, except for transmissions on the Physical Random Access Channel (PRACH). That is, the uplink of the UE is time synchronized with the frame structure in the cell.

The eNodeB has some control over the UL synchronization state of the UEs in a cell served by that eNodeB. Specifically, the UL synchronization state of the UEs in the cell can be controlled to some extent by using the parameter timeAlignmentTimer, which is defined for example in the standards document 3GPP TS 36.321 V12.2.1, section 5.2.

Specifically, a UE is UL synchronized if the time alignment timer is running, but the UE loses UL synchronization when the time alignment timer expires. Thus, the UE is only allowed to transmit any signals other than a preamble when the time alignment timer is running. The time alignment timer starts or restarts when the UE receives a time alignment command. A time alignment command is ordering the UE to use the timing advance that results in UE transmissions that are time aligned with transmissions from other UEs in the cell. The time alignment timer is thus used to control how long the UE is considered to be uplink time aligned after the reception of a time alignment command. However, the time alignment timer will never expire if it is set to zero, and hence the UE will never lose UL synchronization.

The UE can receive the time alignment timer in different ways. The parameter timeAlignmentTimerCommon is transmitted by the eNodeB as part of System Information Block Type 2. The UE is able to read this information, and then sets its time alignment timer based on the value of parameter timeAlignmentTimerCommon when it performs an RRC Connection Establishment or an RRC Connection Re-establishment. However, the UE does not use the parameter timeAlignmentTimerCommon to set its time alignment timer in other cases, i.e. the time alignment timer of a UE is not changed when the value for the parameter timeAlignmentTimerCommon is changed while that UE is already in the RRC Connected state.

The parameter timeAlignmentTimerDedicated is part of the Medium Access Control (MAC)-MainConfig information element. This can be included in the set up procedure as part of an RRC Connection Establishment or during an RRC Connection Reconfiguration. Thus, the UE uses the parameter timeAlignmentTimerDedicated to set its time alignment timer.

When a UE is synchronized in the uplink, it requires various semi-static resources on the Physical Uplink Control Channel (PUCCH), for example for Channel Quality Indication (CQI) related reports, Scheduling Request (SR) signals used by the UE for requesting Uplink-Shared Channel (UL-SCH) resources for new transmissions, and Sounding Reference Signals (SRS) used by the eNodeB to estimate the uplink channel conditions for each user to decide the best uplink scheduling.

Therefore, when a UE loses its uplink synchronization, it releases any semi-static PUCCH resources that it may have. These PUCCH resources are only available in a limited amount.

Therefore, allowing RRC Connected UEs to become unsynchronized in the uplink, and to release the semi-static PUCCH resources, increases the number of UEs that can be kept in the RRC Connected state, compared with the situation where all RRC Connected UEs are kept synchronized in the uplink, with allocated semi-static PUCCH resources.

In one existing example, cells are configured with the time alignment timer value set to a default value of zero, so that all RRC Connected UEs are kept synchronized in the uplink. As mentioned above, this sets a constraint on the number of UEs that can be allowed to remain in the RRC Connected state. The existing example allows cells to be manually configured to have a non-zero value for the time alignment timer, allowing RRC Connected UEs to become unsynchronized in the uplink.

3GPP Technical Specification TS 36.331 V11.2.0, chapter 6.3.2 "Radio resource control information elements" contains a description of the timeAlignmentTimer and how the UE uses the timer value.

Allowing RRC connected UEs to become UL unsynchronized has the disadvantage that there is a higher probability of call failure when the unsynchronized UE attempts to start uplink data transmission than when a synchronized UE attempts to start uplink data transmission. This may be caused by failure of the resynchronization procedure or failure of the following RRC Reconfiguration procedure that allocates the semi-static PUCCH resources to the UE.

SUMMARY

It is an object of the invention to provide a solution to the at least one disadvantage listed above.

According to a first aspect of the disclosure, there is provided a method of operation of a base station in a cellular communications network, in which user equipment devices in a cell served by the base station need to be synchronized with the cell on the uplink in order to transmit data, and in which Radio Resource Control, RRC, connected user equipment devices can be kept synchronized with the cell on the uplink or not synchronized. The method comprises making a determination as to whether a specified condition within the cell served by the base station is fulfilled, and, in response to the determination as to whether the specified condition within the cell is fulfilled, determining whether RRC connected user equipment devices should be kept uplink synchronized with the cell, or whether RRC connected user equipment devices should be allowed to become not synchronized on the uplink. Signals are transmitted to user equipment devices to affect whether or not the RRC connected user equipment devices are kept uplink synchronized with the cell, in response to determining whether RRC connected user equipment devices should be kept uplink synchronized with the cell, or whether RRC connected user equipment devices should be allowed to become not synchronized on the uplink.

Making the determination as to whether the specified condition within the cell served by the base station is fulfilled may comprise determining whether a load within the cell exceeds a threshold value, and determining that RRC connected user equipment devices should be allowed to become not synchronized on the uplink when it is determined that the load within the cell exceeds the threshold value.

Making the determination as to whether the specified condition within the cell served by the base station is fulfilled may comprise comparing a number of RRC connected user equipment devices with a specified threshold number of devices. The specified threshold number of devices may be varied based on available physical uplink control channel, PUCCH, resources in the cell.

A time alignment timer value, to be used by user equipment devices to determine whether or not they can be considered to be uplink synchronized with the base station, may be set to zero if it is determined that all RRC connected user equipment devices should be kept uplink synchronized with the cell, or to a non-zero value if it is determined that RRC connected user equipment devices should be allowed to become not synchronized with the cell on the uplink.

For each RRC connected user equipment device, an inactivity timer may be set, to be used in determining whether the user equipment device should switch to an idle mode when inactive, wherein the value of the activity timer is set based on the time adjustment timer value that was most recently transmitted to that user equipment device.

According to a second aspect of the disclosure, there is provided a base station, for use in a cellular communications network, in which user equipment devices in a cell served by the base station need to be synchronized with the cell on the uplink in order to transmit data, and in which Radio Resource Control, RRC, connected user equipment devices can be kept synchronized with the cell on the uplink or not synchronized. The base station comprises processing means operative to: make a determination as to whether a specified condition within the cell served by the base station is fulfilled, and, in response to the determination as to whether the specified condition within the cell is fulfilled, determine whether RRC connected user equipment devices should be kept uplink synchronized with the cell, or whether RRC connected user equipment devices should be allowed to become not synchronized on the uplink, and transmit signals to user equipment devices to affect whether or not the RRC connected user equipment devices are kept on the uplink synchronized with the cell, in response to determining whether RRC connected user equipment devices should be kept synchronized with the cell on the uplink, or whether RRC connected user equipment devices should be allowed to become not synchronized on the uplink.

The processing means may comprise a processor and a memory, said memory containing instructions executable by said processor.

According to a third aspect of the disclosure, there is provided a computer program product, comprising a carrier containing instructions for causing a processor to perform a method according to the first aspect.

According to a fourth aspect of the disclosure, there is provided a method of operation of a cellular communications network, comprising at least one base station and a plurality of user equipment devices, wherein user equipment devices in a cell served by the base station need to be uplink synchronized with the cell in order to transmit data, and in which Radio Resource Control, RRC, connected user equipment devices can be kept synchronized with the cell or not synchronized. The method comprises making a determination as to whether a specified condition within the cell served by the base station is fulfilled. In response to the determination as to whether the specified condition within the cell is fulfilled, it is determined whether RRC connected user equipment devices should be kept uplink synchronized with the cell, or whether RRC connected user equipment devices should be allowed to become not synchronized on the uplink. Signals are transmitted to user equipment devices to affect whether or not the RRC connected user equipment devices are kept uplink synchronized with the cell, in response to determining whether RRC connected user equipment devices should be kept uplink synchronized with the cell, or whether RRC connected user equipment devices should be allowed to become not synchronized on the uplink. The signals are received in the RRC connected user equipment devices, and said RRC connected user equipment devices thereafter operate so as to maintain uplink synchronization with the cell, or to allow the possibility to become not synchronized on the uplink, in response to said received signals.

According to a fifth aspect of the disclosure, there is provided a cellular communications network, comprising at least one base station and a plurality of user equipment devices, wherein user equipment devices in a cell served by the base station need to be uplink synchronized with the cell in order to transmit data, and in which Radio Resource Control, RRC, connected user equipment devices can be kept synchronized with the cell or not synchronized. The base station is configured for making a determination as to whether a specified condition within the cell served by the base station is fulfilled, and, in response to the determination as to whether the specified condition within the cell is fulfilled, determining whether RRC connected user equipment devices should be kept uplink synchronized with the cell, or whether RRC connected user equipment devices should be allowed to become not synchronized on the uplink. The base station transmits signals to user equipment devices to affect whether or not the RRC connected user equipment devices are kept uplink synchronized with the cell, in response to determining whether RRC connected user equipment devices should be kept uplink synchronized with the cell, or whether RRC connected user equipment devices should be allowed to become not synchronized on the uplink. The user equipment devices are configured for: receiving said signals, and operating so as to maintain uplink synchronization with the cell, or to allow the possibility to become not synchronized on the uplink, in response to said received signals.

Thus, the possibility of allowing RRC Connected UEs to become unsynchronized in the uplink is used in situations where the conditions in the cell suggest that it will be advantageous to do so.

DETAILED DESCRIPTION

Figure 1:
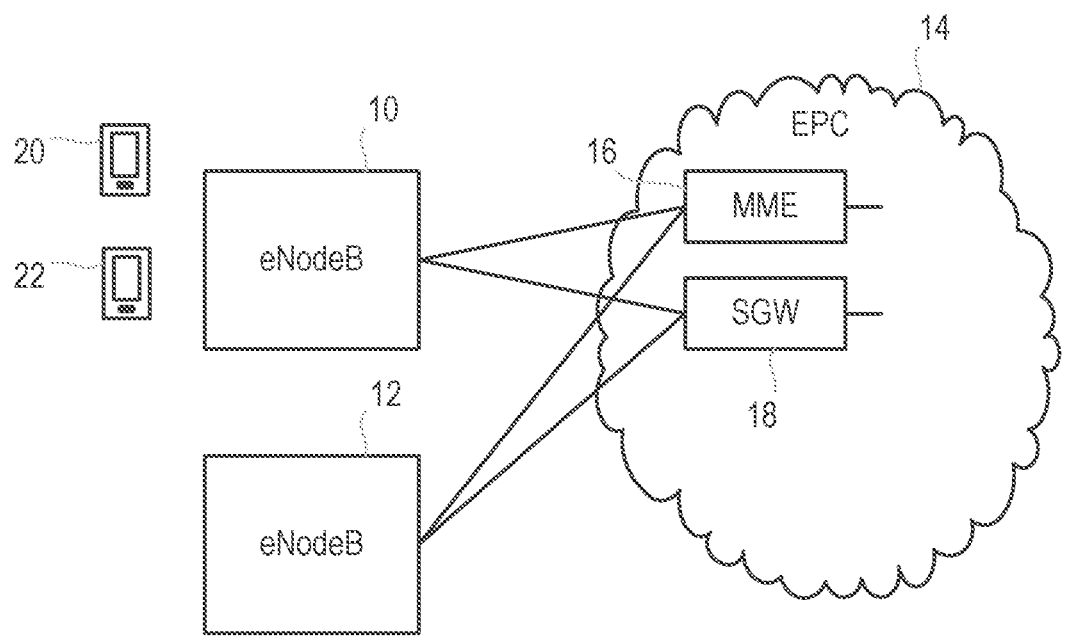
FIG. 1 is a block diagram, illustrating embodiments of a cellular communications network.

FIG. 1 illustrates a part of a cellular communications network, comprising multiple base stations 10, 12. Each of these base stations has a connection to a core network 14 of the cellular communications network. The connections between the base stations 10, 12 and the core network 14 may be wired, or wireless, or a mixture of wired and wireless connections. It will be appreciated that a typical cellular communications network will include more base stations than are shown here, but FIG. 1 shows enough of the network for an understanding of the present method.

The cellular communications network may use any communications technology. In one embodiment, the cellular communications network operates using the Long Term Evolution (LTE) technology, and this description will relate to that specific network technology, but the methods described herein can be used in any suitable wireless cellular network.

In an LTE network, the radio access network is referred to as the Evolved UMTS Terrestrial Radio Access Network (E-UTRAN), and the base stations 10, 12 are commonly referred to as Evolved NodeBs, eNodeBs or eNBs. The core network 14 includes multiple nodes, performing respective standardized functions. For an understanding of the present method, it is sufficient to note that, in the case of the LTE cellular communications network, the core network 14 takes the form of the Evolved Packet Core (EPC), and includes a Mobility Management Entity (MME) node 16, and a Serving Gateway (SGW) 18.

Each base station provides coverage for devices in its coverage area, or cell. In a typical cellular communications network, there are macrocells that have a relatively large coverage area, with the macrocells together providing coverage across the whole of the area served by the network. In addition, there are smaller cells, which provide additional coverage in parts of the area served by the network, where the demand requires this additional capacity. For example, the smaller cells may be provided in urban areas, within different parts of a building, etc. The base stations 10, 12 may take the form of small cell base stations or macrocell base stations.

The method is described herein with reference to an example in which each base station provides coverage for a single cell, but the method is also applicable to examples in which one or more of the base stations in the radio access network serves more than one cell.

FIG. 1 shows two wireless devices 20, 22, which are in the cell served by the base station 10. It will be appreciated that a typical cellular communications network will include many more wireless devices than are shown here, but FIG. 1 shows enough of the network for an understanding of the present method.

The wireless devices 20, 22 may be of any type suitable for bidirectional communication with the cellular communications network. For example, the devices may be mobile phones, smartphones, portable computers or the like, that are intended to be operated by a user while moving, or may be devices such as wireless routers that are intended to operate from a generally fixed location, or may be devices such as tracking devices, or devices using Machine-Type Communications (MTC) that are intended to operate without direct human intervention while moving or stationary. In a typical network, most of the wireless devices are User Equipment devices (UEs), and that term is also used in the following description to describe a traditional user equipment device, or any other device, component, element, endpoint, or object capable of initiating or receiving voice, audio, video, media, or data exchanges within the communication system.

Figure 2:
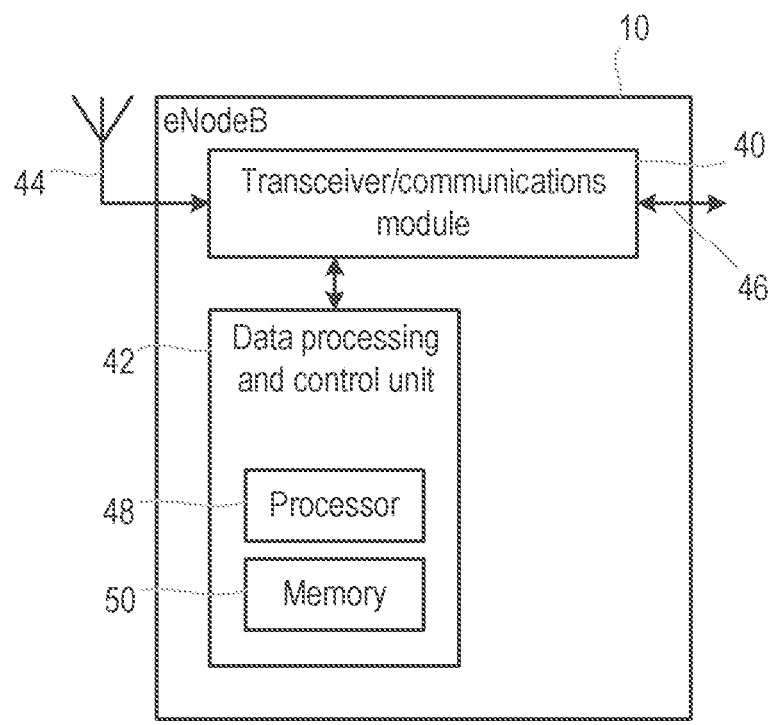
FIG. 2 is a block diagram, illustrating embodiments of a base station in a cellular communications network.

FIG. 2 illustrates the general form of a base station in the cellular communications network, in this case the base station 10, although the other base stations, such as base station 12, may have generally the same form. Specifically, the base station 10 in this example is an eNodeB for use in an LTE network, and includes a transceiver/communications module 40 and a data processing and control unit 42.

The transceiver/communications module 40 is able to provide the required communications over the radio interface in the cellular communications network through a connection to an antenna 44. Thus, in this illustrated case of an LTE eNodeB, the communications over the radio interface use the Evolved UMTS Terrestrial Radio Access (E-UTRA) protocols. In this illustrated embodiment, the transceiver/communications module 40 is able to communicate over system downlink channels with user equipment devices that are present in the network, and is able to receive signals that are transmitted by the user equipment devices over system uplink channels.

The transceiver/communications module 40 is also connected via a connection 46 to the core network 14 of the cellular communications network. More generally, the transceiver/communications module 40 includes network elements for receiving, transmitting, and/or otherwise communicating data or information in a network environment.

The data processing and control unit 42 includes at least one processor 48, and at least one memory 50, wherein the memory 50 stores a program, containing instructions for causing the processor to perform various processes, including those described herein.

The processor 48 may be a single device or may include multiple devices operating together, in order to execute any type of instructions associated with the data to achieve the operations detailed herein. The processor 48 may operate with fixed logic or programmable logic (e.g., software/computer instructions executed by the processor). The instructions for causing the processor to perform the operations described herein may be provided on a suitable carrier as a computer program product.

The memory 50 may similarly be provided as a single device, or as multiple devices operating together for storing information to be used in performing the activities described herein. The memory 50 may take the form of, or may include, Random Access Memory (RAM), Read Only Memory (ROM), Electrically Erasable Programmable Read Only Memory (EEPROM), Flash memory, etc., in a fixed or removable component, device, element, or object.

In the illustrated LTE system, and in other systems, the UE 20, 22 must be synchronized in the uplink in order to be able to transmit signals to the eNodeB over the air interface. That is, the uplink of the UE is time synchronized with the frame structure in the cell. However, it is important to note that the UE does not need to be synchronized in the uplink if there is no need for uplink transmissions. If a UE is not synchronized in the uplink it must re-synchronize by means of a Random Access procedure before it is allowed to transmit anything other than a preamble.

When a UE is synchronized in the uplink, it is typically allocated various semi-static resources on the Physical Uplink Control Channel (PUCCH), to provide significant performance improvements. For example, PUCCH resources are provided for periodic Channel Quality Indication (CQI) related reports, which are transmitted by the UE to the eNodeB to provide the eNodeB with information on the downlink (DL) Signal-to-Interference-plus-Noise Ratio (SINR) for the UE. This information is used for DL link adaption. The DL throughput will decrease if the UE has no resources for periodic CQI.

The UE may also be allocated PUCCH resources for Scheduling Request (SR) signals used by the UE for requesting Uplink-Shared Channel (UL-SCH) resources for new transmissions and for Sounding Reference Signals (SRS) used by the eNodeB to estimate the uplink frequency resolved channel conditions for each user to be used in deciding the best uplink scheduling.

After reception of an SR, the eNB will respond with an uplink (UL) grant to provide resources. If no SR resources are configured by the UE, the UE will use a contention based random access procedure to transmit a Buffer Status Report (BSR) to the eNodeB and indicate its need for UL resources in that way. The random access procedure requires more signaling and time than the procedure using SR.

The UE will typically also be allocated PUCCH resources that it can use for sending Rank Indication (RI) reports, which allow the eNodeB to determine the appropriate transmission mode.

When a UE loses its uplink synchronization, it releases any semi-static PUCCH resources that it may have.

These PUCCH resources are only available in a limited amount. If all UEs are synchronized in the uplink irrespective of their activity in the uplink, then only a fixed number of UEs can use the semi-static resources. If more than that fixed number of UEs are RRC Connected, then those in excess of the fixed number will not be allocated semi-static PUCCH resources, and the throughput and latency performance of those UEs will be degraded. For example, it might be impossible to allocate resources for Sounding Reference Signals (SRS) to those UEs.

Therefore, if the amount of semi-static PUCCH resources is not sufficient for allocation to all RRC Connected UEs, allowing RRC Connected UEs to become unsynchronized in the uplink, and to release the PUCCH resources, increases the possibility that another active UE, with data to transmit to the eNodeB, can be kept in the RRC Connected state, synchronized in the uplink, with allocated semi-static PUCCH resources.

However, allowing RRC Connected UEs to become unsynchronized in the uplink has the disadvantage that there is a higher probability of call failure when an unsynchronized UE requires uplink resynchronization to start uplink data transmission than when a synchronized UE starts uplink data transmission. This may be caused by failure of the resynchronization procedure or the following RRC Reconfiguration procedure that allocates the semi-static PUCCH resources to the UE or the latency caused by the resynchronization procedure.

The present disclosure proceeds from the recognition that, in any given cell, there may be times when it is preferable to keep all RRC Connected UEs synchronized in the uplink, and avoid the higher probability of call failure when an unsynchronized UE requires uplink resynchronization to start uplink data transmission, and there may be other times when it preferable to allow RRC Connected UEs to become unsynchronized in the uplink and hence to increase the number of UEs that can be kept in the RRC Connected state, even though this risks the higher probability of call failure when an unsynchronized UE attempts to start uplink data transmission.

Figure 3:
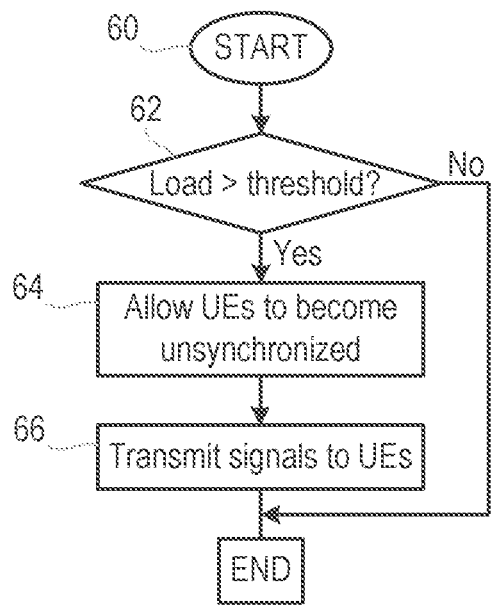
FIG. 3 is a flow chart, illustrating embodiments of method steps.

FIG. 3 illustrates a first method, which takes place when a base station, for example in the form of an eNodeB, is operating with all RRC Connected UEs 20, 22 kept synchronized in the uplink. The process starts at step 60, and proceeds to step 62, in which it is determined whether a specified condition in the cell is fulfilled.

In this illustrated example, the specified condition relates to the load in the cell. Thus, it is determined in step 62 whether the number of RRC Connected UEs exceeds a first threshold number. If the number of RRC Connected UEs, indicated as "Load", does not exceed the first threshold number, the process ends, but, if the number of RRC Connected UEs does exceed the first threshold number, the process passes to step 64, in which it is determined that RRC Connected UEs should be allowed to become unsynchronized.

Thus, in step 66, signals are transmitted to the UEs that allow RRC Connected UEs to become unsynchronized. They therefore need to re-synchronize with the cell in order to be able to transmit.

If only active UEs are UL synchronized, then it is only these UEs that need to have semi-static PUCCH resources allocated. As a consequence the number of semi-static resources required in the cell is less than if all UEs that are RRC Connected have PUCCH resources. There will also be fewer transmissions on the PUCCH, resulting in reduced interference. When UEs become un-synchronized on the uplink, they do not require time alignment commands. As time alignment commands require scheduling resources with high priority in the eNodeB as well as resources, and also require resources on the Physical Downlink Control Channel (PDCCH), Physical Downlink Shared Channel (PDSCH) and Physical Hybrid-ARQ Indicator Channel (PHICH) it is advantageous to avoid the need for this scheduling.

Also, UEs that are not UL synchronized do not transmit signals such as periodic Channel Quality Indication (CQI) related reports on the uplink, and so this reduces power consumption of the UE.

Figure 4:
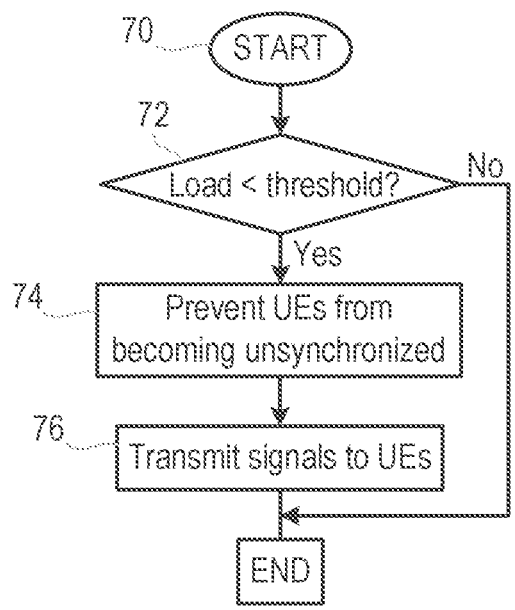
FIG. 4 is a flow chart, illustrating embodiments of method steps.

FIG. 4 illustrates a second method, which takes place when a base station, for example in the form of an eNodeB, is operating in such a manner that RRC Connected UEs 20, 22, are allowed to become unsynchronized in the uplink. The process starts at step 70, and proceeds to step 72, in which it is determined whether a specified condition in the cell is fulfilled.

In this illustrated example, the specified condition relates to the load in the cell. Thus, it is determined in step 72 whether the number of RRC Connected UEs, indicated as "Load", is lower than a second threshold number. If the number of RRC Connected UEs is equal to or exceeds the second threshold number, the process ends, but, if the number of RRC Connected UEs is lower than the second threshold number, the process passes to step 74, in which it is determined that all RRC Connected UEs should be kept synchronized on the uplink.

Thus, in step 76, signals are transmitted to the UEs that maintain all RRC Connected UEs in the synchronized state.

UEs that are not UL synchronized when they need to be scheduled require re-synchronization through a random access procedure. If the weakest part of the link budget for random access is weaker than the link budget for Acknowledged Mode (AM) signaling then the re-synchronization may fail. This may result in a dropped call since it can be counted as a radio link failure. Also, semi-static PUCCH resources need to be allocated immediately after UL re-synchronization by means of a RRC Reconfiguration. During the time between UL re-synchronization and the actual configuration of the PUCCH resources in the UE, the UE will not have resources for sending SR or SRS signals, or periodic CQI or RI reports. Also, the latency due to the resynchronization procedure can cause failure of a handover procedure or any other procedure with latency requirements.

The processes shown in FIGS. 3 and 4 therefore operate together such that, when a cell is relatively highly loaded, RRC Connected UEs in the cell are allowed to become unsynchronized on the uplink. The effect is that, at any given time, only a fraction of the RRC Connected UEs in the cell will actually be synchronized on the uplink. This has the advantage that more UEs can be kept RRC Connected while using the same amount of semi-static PUCCH resources, and this benefit is seen to exceed the drawback that the required re-synchronization procedure increases the UE drop rate. By contrast, when a cell is relatively lightly loaded, RRC Connected UEs in the cell are kept synchronized on the uplink. This avoids the disadvantage that the required re-synchronization procedure increases the UE drop rate, and it therefore maintains the retainability Key Performance Indicator (KPI), during periods while the cell does not require additional capacity.

The processes shown in FIGS. 3 and 4 operate automatically, and can be used in some or all of the nodes in a radio access network, allowing those nodes to obtain extra capacity as needed, which is particularly beneficial for cells that only need to use UL re-synchronization during busy periods.

In one example, the base station, for example in the form of an eNodeB, operates such that it switches between one mode in which all RRC Connected UEs in the cell are kept synchronized on the uplink, and another mode in which RRC Connected UEs in the cell are allowed to become unsynchronized on the uplink. In another example, the same processes could be used, while not applying the result to all connected user equipment. For example, there may be one or more specific type of user equipment (such as a device that is used for machine-to-machine communication) that will always be allowed to lose UL synchronization. In another example there may be UEs that operate according to a certain Quality of Service (QoS) not allowing to become un-synchronized in the uplink.

In that case, the base station operates such that it switches between one mode in which all RRC Connected UEs, except the devices that are always allowed to become unsynchronized, are instructed to be kept synchronized on the uplink, and another mode in which all RRC Connected UEs in the cell are allowed to become unsynchronized on the uplink.

The processes illustrated in FIGS. 3 and 4 each make a determination based on whether a specified condition in the cell is fulfilled and, in the illustrated examples, the specified condition relates to the load in the cell. However, other conditions could be used as the basis for the determination as to whether RRC Connected UEs in the cell should be kept synchronized on the uplink, or can be allowed to become unsynchronized.

For example, it is possible to measure the resource utilization of one specific resource, for example SR or CQI, or a combination of resources and measure the utilization of these.

Figure 5:
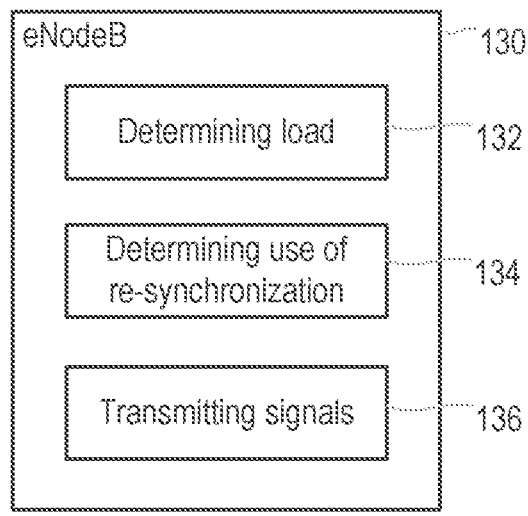
FIG. 5 is a block diagram, illustrating embodiments of a base station in a cellular communications network.

FIG. 5 is a block diagram, illustrating an eNodeB 130 that can be used as the eNodeB 10 or 12 in FIG. 1, according to one embodiment, for performing the methods illustrated in FIGS. 3 and 4. Thus, the eNodeB 130 includes a module 132 for making a determination as to whether a specified condition within the cell served by the base station is fulfilled, primarily. In one embodiment, this may involve making a determination of the load within the cell. The eNodeB 130 also includes a module 134 for, in response to the determination as to whether the specified condition within the cell is fulfilled, determining whether to use the possibility of re-synchronization in the cell. That is, in one embodiment, determining whether connected user equipment devices should be kept uplink synchronized with the cell, or whether connected user equipment devices should be allowed to become not synchronized on the uplink. The eNodeB 130 also includes a module 136 for transmitting signals to connected user equipment devices to affect whether or not the connected user equipment devices are kept uplink synchronized with the cell. The modules (or "means") shown in FIG. 5 may be implemented as a computer program running on the processor 48 shown in FIG. 2.

FIGS. 3 and 4 illustrate processes that use a first threshold number and a second threshold number, respectively. The first threshold number and the second threshold number may be equal or, in order to introduce an element of hysteresis and prevent the base station from switching too frequently between the two modes, the first threshold number may be greater than the second threshold number.

The first threshold number and the second threshold number, used respectively in the processes shown in FIGS. 3 and 4, may be predetermined fixed values, or they may vary over time.

Figure 6:
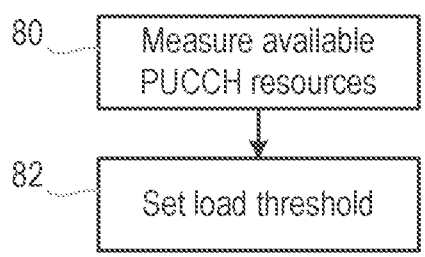
FIG. 6 is a flow chart, illustrating embodiments of method steps.

FIG. 6 illustrates a process in which the first threshold number and the second threshold number may be varied.

In step 80, the base station, for example in the form of an eNodeB, measures its available Physical Uplink Control Channel (PUCCH) resources, and, in step 82, it sets the first threshold number and the second threshold number on the basis of the available PUCCH resources. Thus, when the base station determines that the number of available PUCCH resources is relatively large, it may set the first and second threshold numbers to relatively large values because the base station is able to allocate PUCCH resources to a relatively large number of RRC Connected UEs that are kept synchronized on the uplink. By contrast, when the base station determines that the number of available PUCCH resources is relatively small, it may set the first and second threshold numbers to relatively small values because the base station is able to allocate PUCCH resources to fewer RRC Connected UEs that are kept synchronized on the uplink, and so it is more advantageous to move to a mode in which RRC Connected UEs are allowed to become unsynchronized.

As one example, the first and second threshold numbers may be set based on the number of UEs that are able to obtain PUCCH resources for sending scheduling requests.

Figure 7:
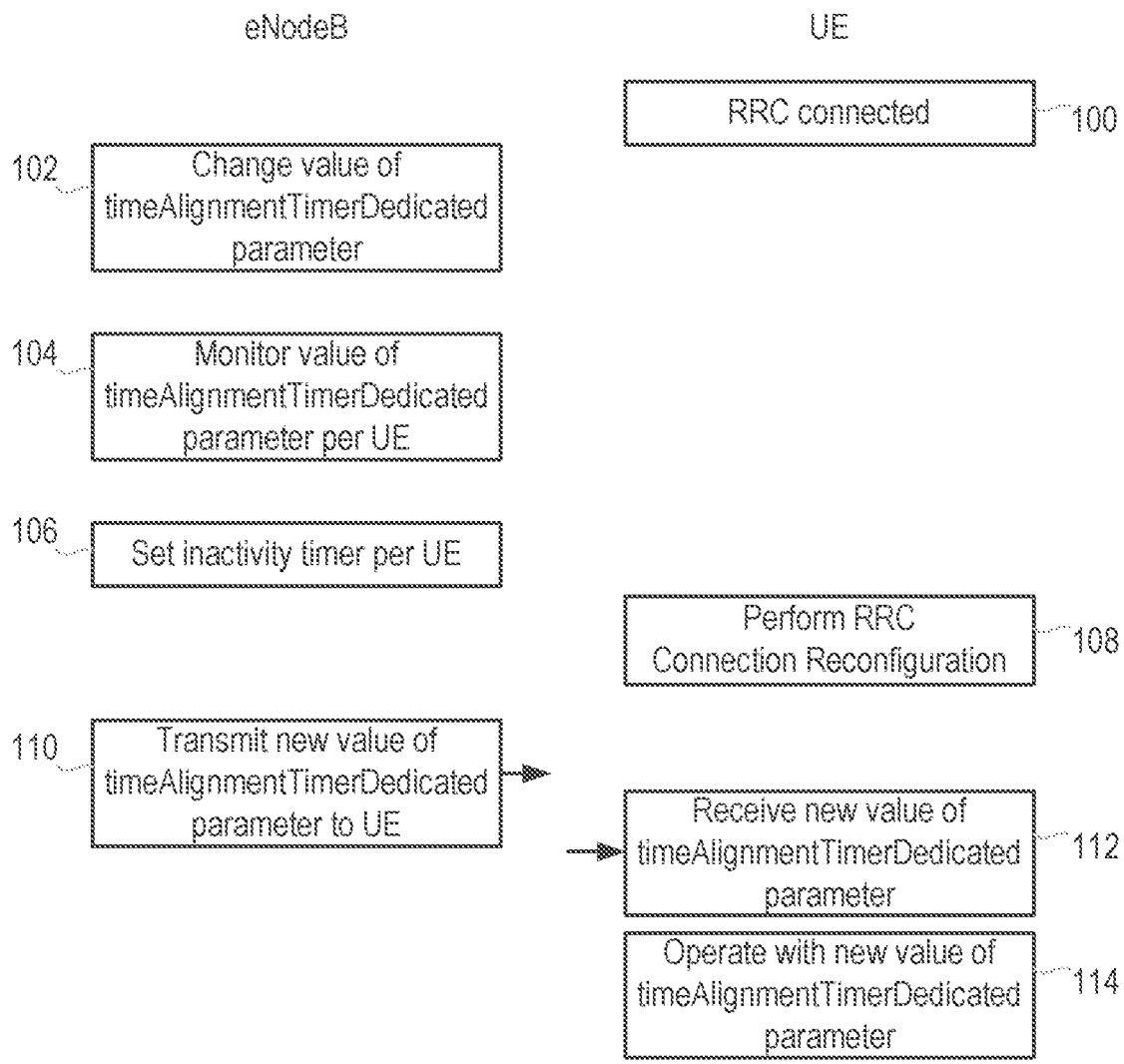
FIG. 7 is a flow chart, illustrating embodiments of method steps.

FIG. 7 illustrates in more detail a signaling diagram of a process as shown in FIG. 3 and in FIG. 4. The process shown in FIG. 7 starts at step 100, at which the UE is operating in RRC Connected mode. For the purposes of the illustrated process shown in FIG. 7, it is not relevant whether the UE is uplink synchronized with the eNodeB, or not.

The process shown in FIG. 7 is an example in which the eNodeB affects whether the RRC Connected UEs are kept synchronized on the uplink, or whether they are allowed to become unsynchronized, by transmitting signals that control the operation of the time alignment timer in each UE. In this example, the UL synchronization state of each UE in the cell is controlled by using the parameter timeAlignmentTimer, which is defined for example in the standards document 3GPP TS 36.321 V12.2.1, section 5.2.

Specifically, a UE is UL synchronized if the time alignment timer is running, but the UE loses UL synchronization when the time alignment timer expires. The time alignment timer starts or restarts when the UE receives a time alignment command. A time alignment command orders the UE to use the timing advance that results in UE transmissions that are time aligned with transmissions from other UEs in the cell. The time alignment timer is thus used to control how long the UE is considered to be uplink time aligned after the reception of a time alignment command. However, the time alignment timer will never expire if it is set to zero, and hence the UE will never lose UL synchronization.

In step 102 of the process shown in FIG. 7, the eNodeB determines that the mode of operation should be changed, for example following a determination as shown in step 64 of FIG. 3 or step 74 of FIG. 4. That is, if all RRC Connected UEs are kept synchronized on the uplink, there is a determination that they should be allowed to become unsynchronized. Conversely, if RRC Connected UEs are allowed to become unsynchronized on the uplink, there is a determination that they should be kept synchronized.

In the example shown in step 102, this determination is carried out by changing the value of the parameter timeAlignmentTimerDedicated, which is part of the Medium Access Control (MAC)-MainConfig information element.

Thus, any UE that performs a Connection Establishment procedure after the value of the parameter timeAlignmentTimerDedicated has changed will receive the new parameter value configured in the RRC Connection Establishment message. Similarly, any UE that enters (or re-enters) the cell through RRC Re-establishment will receive the new value of the parameter timeAlignmentTimerDedicated during the re-establishment procedure. Also, any UE that enters the cell via a handover will get the new value configured by the handover command.

However, UEs that have been in RRC Connected mode before the value of the parameter timeAlignmentTimerDedicated changed will continue to use the old value until they perform an RRC Connection Reconfiguration.

In step 104, the eNodeB starts, or continues, to monitor the value of the timeAlignmentTimerDedicated parameter that was most recently sent to each RRC Connected UE. Changing the value of the timeAlignmentTimerDedicated parameter does not immediately change the value of this parameter being used by the UEs.

Thus, for a period after any change in step 102, there will be some UEs that are using the previous value of the parameter, as well as UEs that are using the changed value.

More specifically, in an embodiment in which a time alignment timer is set to zero in order to keep the UE synchronized, and is set to a non-zero value to allow UEs to become unsynchronized, there will be a mixture of UEs that have a Time Alignment (TA) timer set to zero and UEs that have a TA timer value that is set to a value not equal to zero. The TA timer is used to control how long the UE considers the serving cell(s) belonging to the associated Timing Advance Group (TAG) to be uplink time aligned after the reception of a time alignment command.

UEs that have been inactive during a certain time period (set by an inactivity timer) can be switched by the eNodeB from RRC Connected mode to RRC Idle mode. This switch can be carried out independently of whether RRC Connected UEs are kept synchronized on the uplink, or are allowed to become unsynchronized. However, this has the disadvantage that, when a UE in Idle mode wishes to transmit, it must switch from RRC Idle mode to RRC Connected mode, which typically takes between 200 and 300 ms, and is therefore potentially noticeable by the user. By contrast, a UE that is unsynchronized can re-synchronize with much less signaling, and this typically takes between 20 and 30 ms.

Since an RRC Connected UE that is unsynchronized on the uplink is using fewer resources than a UE that is kept synchronized, there is less need to switch such a UE to Idle mode and thereby incur the disadvantage associated with this switch.

Therefore, the inactivity timer can be set to a longer time for UEs that are allowed to become unsynchronized. Thus, in step 106 of the process shown in FIG. 7, an inactivity timer value is set for each UE. More specifically, the inactivity timer can be set to a larger value for UEs that are allowed to become unsynchronized, and therefore use UL re-synchronization.

Step 108 shows a UE performing an RRC Connection Reconfiguration. (The same situation would apply for a UE performing an RRC Connection Establishment or RRC Connection Reconfiguration.)

During this process, in step 110, the eNodeB transmits to the UE a value for the timeAlignmentTimerDedicated parameter, specifically the value for the timeAlignmentTimerDedicated parameter that was set in step 102 of the process.

In step 112, the UE receives the new value for the timeAlignmentTimerDedicated parameter, and, in step 114, it operates its time alignment timer on the basis of the new value.

That is, when conditions in the cell are such that the cell is considered highly loaded, or cell resources are highly used, the cell starts to use UL re-synchronization for new UEs and re-established UEs as well as UEs that are RRC Reconfigured. Thus, the UE that performs RRC Connection Reconfiguration will use a non-zero TA timer value. If the eNodeB refrains from sending time alignment commands during a time period that is longer than the time alignment timer, this results in expiration of the time alignment timer, and the UE considers itself to be unsynchronized on the uplink.

When conditions in the cell are such that the cell is considered lightly loaded, or cell resources are lightly used, the cell stops using UL re-synchronization for new UEs and re-established UEs as well as UEs that are RRC Reconfigured. Thus, the UE that performs RRC Connection Reconfiguration will use a timer value equal to zero and will remain synchronized even if the UE does not receive a time alignment command during a relatively long time. The eNodeB can send time alignment commands to the UE when its uplink timing deviates too much from the correct UL timing, and thus UL synchronization is maintained.

Thus, in one embodiment, the use of re-synchronization is controlled by using a non-zero timer value to allow UEs to become unsynchronized on the uplink, and by using a timer value of zero so that UEs remain synchronized.

As an alternative, it is possible to control the use of UL re-synchronization by configuring all UEs with a time alignment timer value that is not equal to zero. Then, when conditions in the cell (for example relatively low load conditions) permit, all UEs can be kept UL synchronized at all times by transmitting suitable time alignment commands to the UEs. When conditions in the cell (for example relatively high load conditions) suggest that the use of UL re-synchronization may be advantageous, the eNodeB refrains from sending time alignment commands during a time period that is longer than the period provided to the time alignment timer.

There is thus provided a system that takes advantage of the fact that UEs that are unsynchronized on the uplink require less resources in the eNodeB and have reduced power consumption.

The invention claimed is:

1. A user equipment (UE) configured to operate in a serving cell provided by a base station in a cellular communications network, the UE comprising:
   a transceiver configured for bidirectional communication with the base station; and
   control circuitry operable in a plurality of Radio Resource Control (RRC) states, the control circuitry being operably coupled to the transceiver such that the control circuitry and the transceiver are configured to:
      establish a Radio Resource Control (RRC) connection with the base station, such that the UE is operating in an RRC Connected state according to a first value of a time alignment timer that indicates a duration that the UE remains uplink synchronized in the serving cell after reception of a time alignment command from the base station;
      perform a reconfiguration of the RRC connection with the base station;
      during the reconfiguration, receive from the base station a second value of the time alignment timer; and
      operate in an RRC Connected state according to the second value of the time alignment timer, wherein:
      one of the first and second values of the time alignment timer indicates that the UE becomes uplink unsynchronized when the UE does not receive a time alignment command from the base station before expiration of the time alignment timer, and
      the other of the first and second values of the time alignment timer indicates that the UE remains uplink synchronized without receiving a time alignment command from the base station.

2. The UE of claim 1, wherein:
   one of the first and second values is equal to zero; and
   the other of the first and second values is non-zero.

3. The UE of claim 2, wherein the first value or the second value being zero indicates that the UE remains uplink synchronized without receiving a time alignment command from the base station.

4. The UE of claim 1, wherein:
   the first value indicates that the UE becomes uplink unsynchronized when the UE does not receive a time alignment command from the base station before expiration of the time alignment timer;
   the second value indicates that the UE remains uplink synchronized without receiving a time alignment command from the base station; and
   the first value is greater than the second value.

5. The UE of claim 1, wherein:
   the first value indicates that the UE remains uplink synchronized without receiving a time alignment command from the base station;
   the second value indicates that the UE becomes uplink unsynchronized when the UE does not receive a time alignment command from the base station before expiration of the time alignment timer; and
   the first value is less than the second value.

6. The UE of claim 1, wherein the control circuitry and the transceiver are configured to operate in an RRC Connected state according to the second value of the time alignment timer by:
   configuring the time alignment timer with the second value, the second value being non-zero; and
   after expiration of the time alignment timer, performing an uplink resynchronization with the serving cell.

7. The UE of claim 1, wherein the control circuitry and the transceiver are configured to operate in an RRC Connected state according to the second value of the time alignment timer by refraining from performing uplink resynchronization with the serving cell based on the second value being zero.

8. A method of operating a user equipment (UE) in a serving cell provided by a base station in a cellular communications network, the method comprising:
   establishing a Radio Resource Control (RRC) connection with the base station, such that the UE is operating in an RRC Connected state according to a first value of a time alignment timer that indicates a duration that the UE remains uplink synchronized in the serving cell after reception of a time alignment command from the base station;
   performing a reconfiguration of the RRC connection with the base station;
   during the reconfiguration, receiving from the base station a second value of the time alignment timer; and
   operating in an RRC Connected state according to the second value of the time alignment timer, wherein:
   one of the first and second values of the time alignment timer indicates that the UE becomes uplink unsynchronized when the UE does not receive a time alignment command from the base station before expiration of the time alignment timer, and
   the other of the first and second values of the time alignment timer indicates that the UE remains uplink synchronized without receiving a time alignment command from the base station.

9. The method of claim 8, wherein:
   one of the first and second values is equal to zero; and
   the other of the first and second values is non-zero.

10. The method of claim 9, wherein the first value or the second value being zero indicates that the UE remains uplink synchronized without receiving a time alignment command from the base station.

11. The method of claim 8, wherein:
   the first value indicates that the UE becomes uplink unsynchronized when the UE does not receive a time alignment command from the base station before expiration of the time alignment timer;

the second value indicates that the UE remains uplink synchronized without receiving a time alignment command from the base station; and the first value is greater than the second value.

12. The method of claim 8, wherein:

the first value indicates that the UE remains uplink synchronized without receiving a time alignment command from the base station;

the second value indicates that the UE becomes uplink unsynchronized when the UE does not receive a time alignment command from the base station before expiration of the time alignment timer; and the first value is less than the second value.

13. The method of claim 8, wherein operating in an RRC Connected state according to the second value of the time alignment timer comprises:

configuring the time alignment timer with the second value, the second value being non-zero; and after expiration of the time alignment timer, performing an uplink resynchronization with the serving cell.

14. The method of claim 8, wherein operating in an RRC Connected state according to the second value of the time alignment timer comprises refraining from performing uplink resynchronization with the serving cell based on the second value being zero.

15. A non-transitory, computer-readable medium storing computer-executable instructions that, when executed by at least one processor comprising a user equipment (UE), configure the UE to perform operations corresponding to the method of claim 8.

* * * * *

UNITED STATES PATENT AND TRADEMARK OFFICE
CERTIFICATE OF CORRECTION

PATENT NO. : 10,925,012 B2
APPLICATION NO. : 16/527658
DATED : February 16, 2021
INVENTOR(S) : Alexander Langereis It is certified that error appears in the above-identified patent and that said Letters Patent is hereby corrected as shown below:

In the Specification

In Column 1, Line 9, delete "2018," and insert -- 2018 (issued as U.S. Pat. No. 10,420,046 on Sep. 17, 2019), --, therefor.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*